No. 785,330. PATENTED MAR. 21, 1905.
S. B. RATHBUN.
CHURN DASHER.
APPLICATION FILED OCT. 10, 1904.

Witnesses
Frank H. Carter
Percy S. Webster.

Inventor
Stephen B. Rathbun
By Joshua B. Webster
Attorney

No. 785,330. Patented March 21, 1905.

UNITED STATES PATENT OFFICE.

STEPHEN B. RATHBUN, OF STOCKTON, CALIFORNIA, ASSIGNOR OF ONE-HALF TO JAMES M. SCHOFIELD, OF STOCKTON, CALIFORNIA.

CHURN-DASHER.

SPECIFICATION forming part of Letters Patent No. 785,330, dated March 21, 1905.

Application filed October 10, 1904. Serial No. 227,806.

*To all whom it may concern:*

Be it known that I, STEPHEN B. RATHBUN, of Stockton, in the county of San Joaquin and State of California, have invented certain new and useful Improvements in Churn-Dashers; and I do hereby declare that the following is a full, clear, and exact description, which will enable others skilled in the art to which it appertains to make and use the same, reference being had to the accompanying drawings, and to letters of reference marked thereon, which form a part of this specification.

My improvements in the churn are designed with the special object of producing a better quality of butter and of obtaining the largest possible yield from the cream.

I use a vertically-revolving agitator consisting of wires strung vertically between horizontal bars, secured upon a vertical shaft in such manner that one of said arms can be adjusted upon said shaft to draw the wires taut and to keep them so. These wires are arranged in the bars on each side of the shaft, each series of wires being preferably composed of a single wire passed continuously through holes in the bars and united at their ends by being twisted together at one of said bars. A tube having an auger-shaped disk at its lower end is removably arranged over said shaft, supported upon the upper bar of the agitator, and provided with a vertically-hinged and perforated wing on each side of said tube in such manner as to fold back upon said tube during the operation of churning for the purpose of throwing the cream constantly before the wings and forming thereby an air-space within the tube, which is a little larger in diameter than the shaft and carried by its upper bar for this purpose. The central air-space thus formed by the wings is of the greatest advantage in making good pure hard butter. In reversing the motion of the agitator the vertically-hinged wings will open against the wires to gather the butter. The auger-shaped disk and its tube are made removable from the agitator, and by lifting them up over the bars to remove the butter the auger-shaped disk allows the milk to strain through it. The fine wires strung vertically between the bars act to break and not to cut the globules or sacks of butter in the cream and leave the butter in solid hard lumps, because the wires do not produce much friction in passing through the cream.

Figure 1:
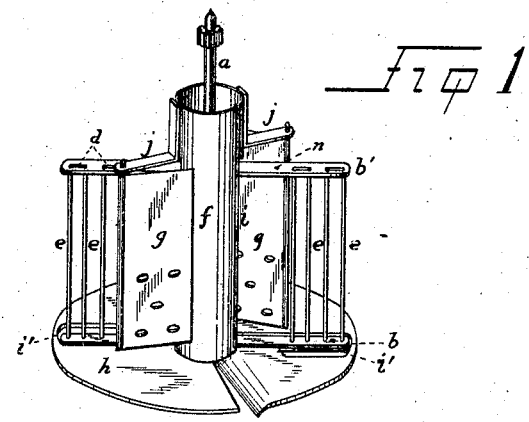
Figure 2:
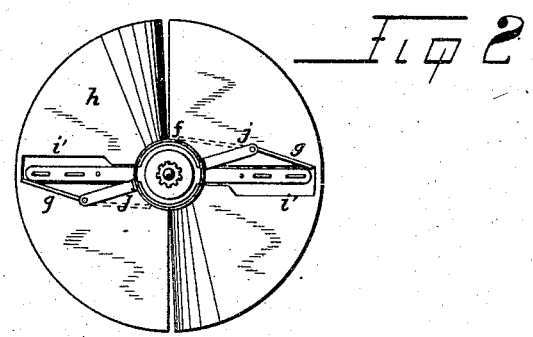

Referring to the drawings, Figure 1 represents my improved churning-agitator with central tube and bottom disk combined therewith; Fig. 2, a top view of the same, and Fig. 3 a side view showing the continuous wires of the agitator.

The shaft $a$ is stepped, as usual, in the churn-tub and carries two horizontal bars $b\ b'$, the lower one of which is fitted over the angular shouldered end of said shaft, and the upper one, $b'$, is secured in position by two nuts $c\ c'$ upon a screw-threaded portion $c^2$ of said shaft for a purpose to be presently stated. Through holes $d$ in these bars on each side of the shaft I pass vertically a continuous wire $e$, such as is used in making brooms, and unite the ends by twisting them together upon one of said bars and draw them taut by adjusting the upper bar by screwing up the under nut $c$ against said upper bar and clamping it upon said nut $c$ by the upper nut. By this construction the wires are always kept at a proper tension, as the lower bar being drawn by the wires against the shoulder of the shaft any upward adjustment of the upper bar will tighten the wires. They can also be readily removed and replaced when broken or when removal is found to be necessary from other cause. I combine with this vertically-wire-strung agitator a tube $f$, placed over its shaft and carrying on each side vertically-hinged perforated wings $g$ and a bottom auger-shaped disk $h$ on a plane with the lower bar.

The tube has vertical side slots $i$, and the disk has radial coincident slots $i'$ to allow said tube and disk to be placed over the bars and to rest upon one, so as to bring the lower bar within the disk-slots $i'$ and allow said tube and disk to be removed by lifting them over said shaft and bars for a purpose to be presently stated.

The perforated wings are hinged to arms *j* of the tube and to the disk in position to lie back against the tube while churning, as shown in Fig. 1, and cause the cream to be thrown against the vertical wires and by this action to form an air-chamber in the space between the shaft and the inner walls of said tube, the central displacement of the cream by the wings producing this effect and the best results upon the butter. In reversing the motion of the agitator these wings will open and lie over the wires and gather the butter, while the auger-shaped disk serves to lift the butter out of the tub and to strain the milk from it.

The upper wire stretching and holding cross-bar does not screw upon the shaft, but is clamped thereon by the nuts. The lower bar is beveled on its opposite edges to lift the cream from the bottom up through the disk.

The shaft is driven by any suitable gearing, and the central tube when used rises to the bottom of the tub-cover.

The particular purpose of the auger-shaped disk is this: In most churns of this character there is always a considerable amount of dead cream in the bottom of the churn. By means of my improved device this cannot occur, as the cream is continuously thrown up by means of the flanges of the auger. This of course saves a considerable amount of cream which would otherwise go to waste.

Revolving knives have been used to cut the globules or cream-sacks; but these also cut the grain of the butter and make it soft and sticky, and the friction of the knife-blades has the effect of making the butter white. The fine wires do not cut the grain of the butter, but leave it hard and with a fine yellow color.

I have stated that the action of the wings is to throw the cream against the wires and to form thereby an air-chamber within the central tube. This result is produced by the centrifugal action of the wings, which, throwing the cream from the center, also draws the air down through the shaft-hole in the tub-cover and drives it out in the cream through the side slots *i* in said tube.

Figure 3:
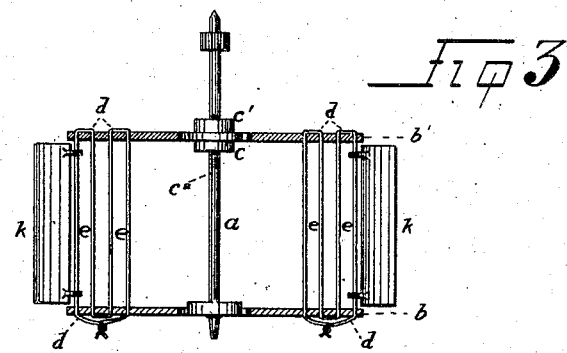

Fig. 3 shows wings K secured on the outer wires *e*. These wings scrape the sides of the churn, thus preventing the accumulation thereon of any particles of butter. By the use of these wings my device may be used as an ice-cream freezer, the wings K when used in that regard being used to scrape the sides of the freezer, and thus prevent the material from freezing thereon.

I am aware that wires have been fixed between cross-bars to form an agitator; but such wires have not been continuously strung through such bars with means for drawing them taut and keeping them at the required tension.

I claim—

1. In a rotary churn, the combination of a vertical shaft, a horizontal arm attached to the bottom of the shaft, a horizontal arm adjustably attached to the shaft above said first-named arm, vertical wires connecting said arms, a tube surrounding said shaft, swinging wings carried by said tube and a disk attached to the bottom of said tube and formed with two diametrically opposite slits, each slit having one edge bent downwardly, substantially as described.

2. In a device of the kind described a vertical shaft stepped in the bottom of the churn-tub, a hollow tube surrounding said shaft and provided with an auger-shaped disk at its lower end, and means attached to said shaft for beating the cream, as set forth.

3. In a device of the kind described the combination of a vertical shaft stepped in the bottom of the churn-tub, a hollow tube surrounding said shaft and provided with an auger-shaped disk at its lower end, having oppositely-inclined downwardly-turned edges at opposite sides of said shaft, flexible wings secured vertically to the outside of said tube, and means attached to said shaft for beating the cream, as specified.

4. In a device of the kind described the combination of a vertical shaft stepped in the churn-tub, a hollow tube surrounding said shaft and provided with an auger-shaped disk at its lower end, said disk having diametrically opposite slits and each slit having a downwardly-turned edge, slots in the sides of said tube slots extending into the base-disk, horizontal bars secured to said shaft and extending outwardly through said slots, vertical wires strung between and fastened to said bars, and vertical wings secured to the outer ones of said wires, all for the purpose specified.

In testimony whereof I have signed my name to this specification in the presence of two subscribing witnesses.

STEPHEN B. RATHBUN.

Witnesses:
PERCY S. WEBSTER,
JOSHUA B. WEBSTER.